United States Patent
Zhang et al.

(10) Patent No.: US 12,240,787 B2
(45) Date of Patent: Mar. 4, 2025

(54) PREPARATION METHOD FOR IMPROVING LIGHT EFFICIENCY AND STABILITY OF LIGHT-STORING CERAMICS

(71) Applicants: Jiangsu Normal University, Xuzhou (CN); Xuzhou All-To Photoelectric Technology Co., LTD, Xuzhou (CN)

(72) Inventors: Le Zhang, Xuzhou (CN); Shunshun Yang, Xuzhou (CN); Rui Wang, Xuzhou (CN); Tao Li, Xuzhou (CN); Xiaowen Zhu, Xuzhou (CN); Xinyu Jiang, Xuzhou (CN); Guocan Huang, Xuzhou (CN); Jian Kang, Xuzhou (CN); Bingheng Sun, Xuzhou (CN); Cen Shao, Xuzhou (CN); Tianyuan Zhou, Xuzhou (CN); Hao Chen, Xuzhou (CN)

(73) Assignees: Jiangsu Normal University, Xuzhou (CN); Xuzhou All-To Photoelectric Technology Co., LTD, Xuzhou (CN)

( * ) Notice: Subject to any disclaimer, the term of this patent is extended or adjusted under 35 U.S.C. 154(b) by 763 days.

(21) Appl. No.: 17/539,441

(22) Filed: Dec. 1, 2021

(65) Prior Publication Data
US 2022/0089499 A1    Mar. 24, 2022

Related U.S. Application Data

(63) Continuation of application No. PCT/CN2019/096257, filed on Jul. 17, 2019.

(30) Foreign Application Priority Data

Jul. 2, 2019    (CN) .......................... 201910587378.9

(51) Int. Cl.
C04B 35/465    (2006.01)
C04B 24/38     (2006.01)
(Continued)

(52) U.S. Cl.
CPC .......... *C04B 35/465* (2013.01); *C04B 24/383* (2013.01); *C04B 35/624* (2013.01);
(Continued)

(58) Field of Classification Search
CPC .... C04B 2235/3222; C04B 2235/6023; C04B 2235/3236; C04B 35/624; C04B 35/465
See application file for complete search history.

(56) References Cited

FOREIGN PATENT DOCUMENTS

CN    1371957 A  * 10/2002
CN    1861739 A  * 11/2006
(Continued)

*Primary Examiner* — Seyed Masoud Malekzadeh
*Assistant Examiner* — Timothy G Hemingway
(74) *Attorney, Agent, or Firm* — WPAT, PC

(57) ABSTRACT

A preparation method for improving light efficiency and stability of light storing ceramics is provided. Calcium ethanol solution is added into titanium precursor solution firstly and oleic acid dispersant is added, pure water and the light storing powder are subsequently added to obtain a light-storing powder-calcium titanate gel, and dried, crushed and sieved to obtain xerogel powder. Glass matrix material, sieved xerogel powder and another dispersant are placed into a granulator, and directly mechanically stirred and granulated after adding pure water. A plasticizer is added after stirring 4~8 h, and continuously stirred for 1~3 h to obtain a mixture, pressing, drying and firing. Calcium titanate is manually introduced to protect the light-storing powder from hydrolysis or high-temperature oxidation. It can also change the propagation path of fluorescence inside ceramics, improve light absorption and fluorescence output efficiency and is conducive to ceramic molding.

6 Claims, 2 Drawing Sheets

(51) Int. Cl.
*C04B 35/624* (2006.01)
*C04B 103/30* (2006.01)

(52) U.S. Cl.
CPC .. *C04B 2103/30* (2013.01); *C04B 2235/3213* (2013.01); *C04B 2235/3222* (2013.01); *C04B 2235/3236* (2013.01); *C04B 2235/36* (2013.01); *C04B 2235/6023* (2013.01); *C04B 2235/9646* (2013.01)

(56) References Cited

FOREIGN PATENT DOCUMENTS

| CN | 104193346 A | * | 12/2014 | | |
|----|-------------|---|---------|---|---|
| CN | 106517816 A | * | 3/2017  | ............. | C03C 12/00 |
| CN | 106883842 A | * | 6/2017  | ............. | C09K 11/02 |

* cited by examiner

PREPARATION METHOD FOR IMPROVING LIGHT EFFICIENCY AND STABILITY OF LIGHT-STORING CERAMICS

FIELD OF THE DISCLOSURE

The disclosure relates to the field of light-storing ceramics, and more particularly to a preparation method for improving both light efficiency and stability of light-storing ceramics.

BACKGROUND OF THE DISCLOSURE

Light-storing self-luminous materials can utilize sunlight or light to store light and emit light at night or in dark, which are widely applied to night emergency indication, optoelectronic devices or elements, instrument display, low-degree lighting, household decoration, and national defense and military.

Carrier materials of light-storing products used at domestic and abroad include thin aluminum plate (on which the light-storing material pattern is printed), plastic, ink, resin and other materials that can be shaped after treatment at room temperature or lower temperature. Because luminescent material is simply coated or mixed into the matrix, it will bring the problem of poor thermal shock. Especially in case of fire, high temperature will easily cause the oxidation failure of luminous powder or product melting. Moreover, due to technical problems and the limitation that a thickness of the luminous coating is only 1~2 millimeters (mm), this method obviously cannot provide enough luminous centers to realize high brightness indication or illumination, and its persistent luminescence time is relatively short. Therefore, researchers put forward an "integrated" light-storing multiphase ceramic solution, which has the following advantages: (1) by combining the light-storing function of long persistent luminescence (LPL) materials with quartz ceramic matrix phase, the whole ceramic luminescence can be realized to meet the requirements of high light efficiency; (2) avoiding glaze cracking caused by different expansion coefficients between luminous glaze layer and ceramic matrix; (3) quartz ceramics can be used as matrix to realize the performance of light-storing powder because of its high acid and alkali corrosion resistance and thermal shock resistance, low coefficient of thermal expansion and good volume stability.

However, although this solution has obvious advantages, due to the difference of dielectric refractive index (refractive index of aluminate phosphor: ~1.6, refractive index of quartz-based ceramics: ~1.45-1.50), birefringence will inevitably be caused in the ceramics, resulting in the scattering loss of excitation and fluorescence and the reduction of overall transmittance. Therefore, in order to realize the more extensive application of "integrated" light-storing ceramics in fire indication, horticultural landscape and other fields, there is an urgent need for a simple and effective method to improve the light extraction rate and fluorescence output rate of light-storing ceramics.

SUMMARY OF THE DISCLOSURE

An objective of the disclosure is to provide a preparation method for improving both light efficiency and stability of light-storing ceramics, which can eliminate a birefringence phenomenon inside the ceramics and improve fluorescence output intensity and duration.

In order to achieve the above objective, the technical solution adopted by the disclosure is as follows: a preparation method for improving light efficiency and stability of light-storing ceramics, including:

step (1), weighing calcium nitrate and citric acid individually according to a mass ratio of 10:0.5~1.5, and dissolving the weighed calcium nitrate and the weighed citric acid into an absolute ethanol to form a calcium ethanol solution; weighing a tetra-n-butyl titanate, dissolving the weighed tetra-n-butyl titanate into another absolute ethanol, and adding glacial acetic acid dropwise under stifling to form a titanium precursor solution; and under stirring, adding the calcium ethanol solution into the titanium precursor solution, adding oleic acid dispersant, subsequently adding pure water and a light-storing powder, and continuously stifling 1~4 hours (h) to obtain a light-storing powder-calcium titanate gel;

step (2), heating the light-storing powder-calcium titanate gel obtained by the step (1) at a temperature of 80~150° C. for 2~8 h to obtain a light-storing powder xerogel coated with calcium titanate, crushing, and sieving with a sieve of 80~200 meshes to obtain a sieved xerogel powder;

step (3), placing a glass matrix material, the sieved xerogel powder and a second dispersant into a granulator, directly mechanically stifling and granulating after adding pure water, adding a plasticizer after the stifling of 4~8 h, and continuously stirring for 1~3 h to obtain a mixture; a stifling speed of the stifling in the step (3) is 100-300 radians per minute (rad/min);

step (4), packing the mixture obtained by the step (3) into a mold, tableting by using an automatic tablet pressor, then demolding to obtain green compacts, and subsequently sending the green compacts to a kiln for drying and firing; a shape of the mold is required by product requirements, pressure is 5~40 megapascals (MPa), and pressure holding time is 5~20 seconds (s); and step (5), heating of the kiln including: heating from room temperature to 200° C. with a rate of 2~5° C./min, and then maintaining for 10~30 min to ensure complete evaporation of water from the green compacts; then continuing to heat up to 400~900° C. and maintaining for 60~120 min to ensure that the colorless glass powder completes crystallization and crystal nucleus growth in a semi-molten state, and will not cause thermal damage to long persistent luminescence material; and subsequently cooling down to below 100° C. with the kiln and taking out a finished product to obtain light-storing ceramics with good light transmittance, high persistent luminescence brightness and jade appearance.

In an embodiment, in the step (1), a mass ratio of the calcium nitrate to the tetra-n-butyl titanate is 1:0.8~2.5. In the calcium ethanol solution, a solute to solution ratio is 1:1.5~3. In the titanium precursor solution, a solute to solution ratio is 1:0.5~2.5. An adding amount of the glacial acetic acid accounts for 35%~55% of a total mass of the calcium nitrate and the tetra-n-butyl titanate. An adding amount of the oleic acid dispersant accounts for 5%~15% of the total mass of the calcium nitrate and the tetra-n-butyl titanate. A ratio of an adding amount of pure water to the total mass the calcium nitrate and the tetra-n-butyl titanate is 1:3.5~5. A ratio of an adding amount of light-storing powder to the total mass of the calcium nitrate and the tetra-n-butyl titanate is 1:8~10.

In an embodiment, in the step (1), the light-storing powder selects but is not limited to alkaline earth aluminate long persistent luminescence light-storing powder system, for example, the light-storing powder is a light-storing powder using $SrAl_2O_3$ as a matrix and has a particle size in a range of 10~500 microns (μm).

In an embodiment, in the step (3), the glass matrix material is glass powder with a particle size in a range of 10~400 μm, and an adding amount of the glass powder is 90%~98% of the total mass of the xerogel powder and the glass powder.

In an embodiment, in the step (3), a mass ratio of xerogel powder to glass powder is 1:9~49. An adding amount of the second dispersant accounts for 0.1~0.6% of the total mass of the xerogel powder and the glass powder. An adding amount of the plasticizer accounts for 0.1~0.9% of the total mass of the xerogel powder and the glass powder. An adding amount of the pure water accounts for 20%~50% of the total mass of xerogel and the glass powder.

In an embodiment, in the step (3), the plasticizer is methylcellulose, and the second dispersant is sodium tripolyphosphate.

Compared with the prior art, the embodiments of the disclosure may mainly have the following beneficial effects.
1. calcium titanate (refractive index ~1.57) is introduced manually, and calcium titanate forms a fully coating coated on the surface of light-storing powder, and the coating is between aluminate phosphor (refractive index: ~1.6) and quartz-based ceramics (refractive index: ~1.45-1.50), which eliminates the birefringence phenomenon inside the ceramics and improves the fluorescence output intensity and duration;
2. the problem of weather resistance of "integrated" light-storing ceramics is solved through calcium titanate coating;
3. the sterility of ceramic slurry is improved by adding light-storing powder with calcium titanate on the surface;
4. 720 min persistent luminescence can be achieved under the condition of 20 min light storage: luminous intensity >4000 millicandelas per square meter ($mcd/m^2$) at initial 1 min; luminous intensity >400 $mcd/m^2$ at 60 min; luminous intensity >5 $mcd/m^2$ at 720 min (tested in outdoor direct sunlight for 20 min, fluorescent lamp for 30 min, ultraviolet lamp for 5 min, room temperature 25° C.); and
5. service life of the light-storing ceramics is the same as that of building ceramics, at least 15 years without aging, and more than 8 years in water.

DETAILED DESCRIPTION OF EMBODIMENTS

Figure 1:
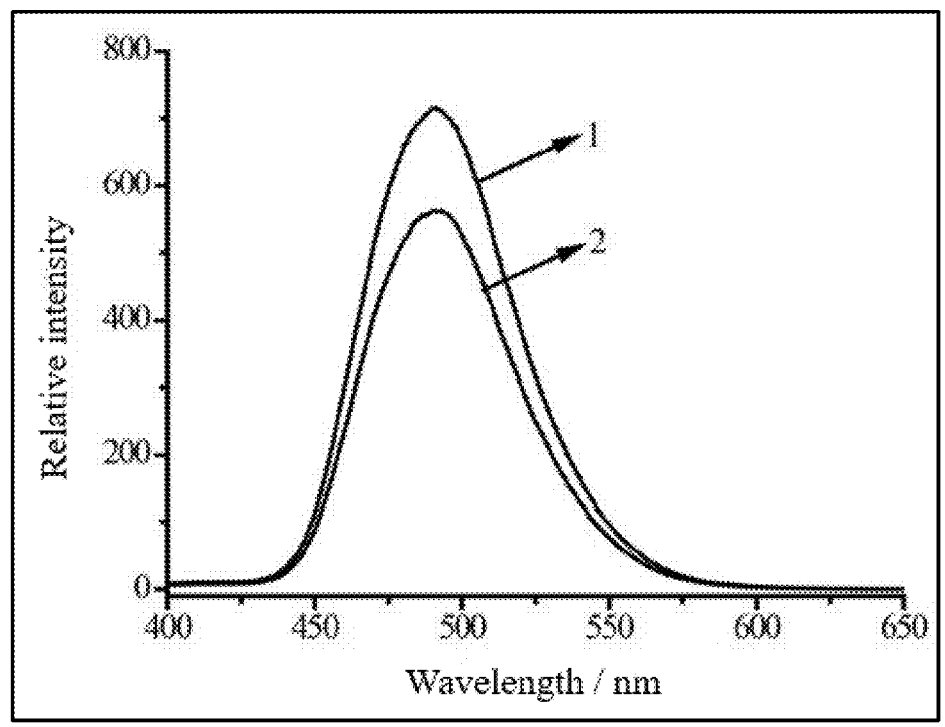
FIG. 1 shows a comparison of luminous intensity between a light-storing ceramic prepared in embodiment 1 of the disclosure and a commercially available light-storing indicator (where 1 is the light-storing ceramic in the embodiment 1, and 2 is the commercially available light-storing indicator).

The disclosure is described in further detail below in combination with the accompanying drawings and specific embodiments.

In the following illustrated embodiments, unless otherwise specified, the experimental method is usually implemented according to conventional conditions or conditions recommended by the manufacturer; and the raw materials and reagents used are commercially available commodities.

The formulas of the following six embodiments are shown in Table 1 and Table 2.

TABLE 1

Ingredients of light-storing powder-calcium titanate gels

| Embodiment | Calcium nitrate (%) | Tetra-n-butyl titanate (%) | Glacial acetic acid (%) | Oleic acid (%) | Light-storing powder (%) | Pure water (%) |
|---|---|---|---|---|---|---|
| 1 | 55.5 | 45.5 | 35 | 5 | 12.5 | 28.5 |
| 2 | 55.5 | 45.5 | 35 | 5 | 12.5 | 28.5 |
| 3 | 28.5 | 72.5 | 55 | 15 | 10 | 20 |
| 4 | 28.5 | 72.5 | 55 | 15 | 10 | 20 |
| 5 | 45 | 65 | 40 | 10 | 11 | 25 |
| 6 | 45 | 65 | 40 | 10 | 11 | 25 |

TABLE 2

Ingredients of light-storing ceramics

| Embodiment | Xerogel powder (%) | Glass powder (%) | Plasticizer (%) | Dispersant (%) |
|---|---|---|---|---|
| 1 | 2 | 98 | 0.1 | 0.1 |
| 2 | 10 | 90 | 0.6 | 0.4 |
| 3 | 2 | 98 | 0.3 | 0.3 |
| 4 | 10 | 90 | 0.5 | 0.6 |
| 5 | 5 | 95 | 0.9 | 0.2 |
| 6 | 7 | 93 | 0.8 | 0.1 |

Embodiment 1

A specific preparation method may include the following steps:
step (1), calcium nitrate and citric acid are weighed individually according to a mass ratio of 10:0.5, the weighed calcium nitrate and the weighed citric acid are dissolved into absolute ethanol, and magnetically stirred for 20 minutes (min) at rotational speed of 150 revolutions per minute (r/min) to form a calcium ethanol solution. Tetra-n-butyl titanate is weighed and dissolved into absolute ethanol, magnetically stirred for 20 min at the rotational speed of 150 r/min, and glacial acetic acid is added dropwise under stirring to form a titanium precursor solution. Under stirring, the calcium ethanol solution is added into the titanium precursor solution, oleic acid dispersant is added, and pure water and light-storing powder ($Sr_4Al_{14}O_{25}$:Eu, Dy, where Eu represents an electron capture center, Dy represents a hole capture center; 500 microns (μm) of particle size) are subsequently added and continuously stirred for 1 hour (h) to obtain a light-storing powder-calcium titanate gel.
step (2), the light-storing powder-calcium titanate gel obtained by the step (1) is heated at 80° C. for 2 h to obtain a light-storing powder xerogel coated with calcium titanate, and the light-storing powder xerogel coated with calcium titanate is crushed and sieved with a sieve of 80 meshes to obtain a sieved xerogel powder.
step (3), 400 μm of glass powder, 80 mesh of xerogel powder and sodium tripolyphosphate as second dispersant are placed into a granulator, and directly mechanically stirred and granulated after adding pure water. Methylcellulose as a plasticizer is added after stirring for 8 h, and continuously stirred for 3 h to obtain a mixture, which is paste, mortar or viscous substance. A stirring speed of the stirring in the step (3) is 300 radians per minute (rad/min).

step (4), the mixture obtained by the step (3) are packed into a mold for tabletting by using an automatic tablet pressor, then demolded to obtain green compacts, and the green compacts are subsequently sent to a kiln for drying and firing. A shape of the mold is square sheet (20 centimeters (cm)*20 cm), pressure is 40 megapascals (MPa), and pressure holding time is 20 seconds (s).

step (5), heating of the kiln including: the kiln is heated from room temperature to 200° C. with a rate of 5° C./min, and then the temperature is maintained for 30 min; then the kiln is continued to heat up to 900° C. with a rate of 3° C./min and the temperature is maintained for 120 min; and a finished product is taken out after cooling down to below 100° C. in the kiln.

FIG. 1 is a comparison of luminous intensity between the light-storing ceramic prepared in embodiment 1 of the disclosure and a commercially available light-storing indicator. It can be seen that the luminous intensity of the light-storing ceramic prepared in the illustrated embodiment is relatively higher.

Figure 2:
FIG. 2 is a physical view of the light-storing ceramic prepared according to the embodiment 1 of the disclosure.

FIG. 2 is a physical view of the light-storing ceramic prepared in embodiment 1 of the disclosure. Blue-green light can be observed in the dark.

Figure 3A:
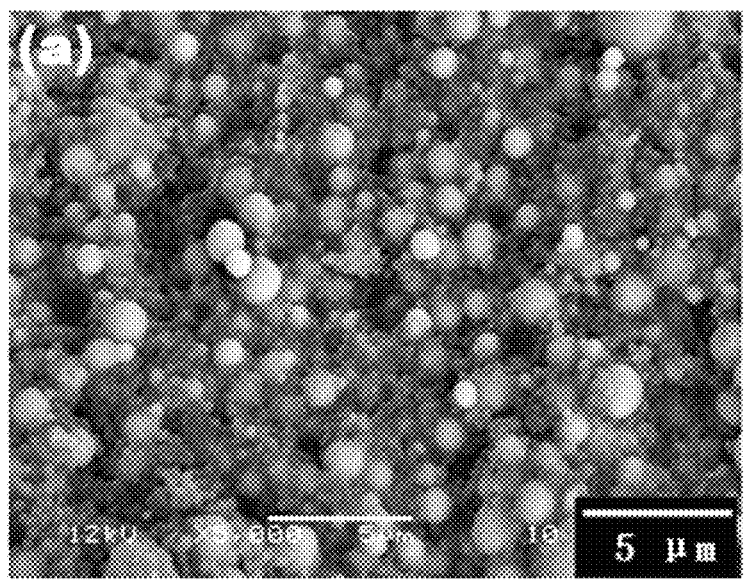
FIG. 3A is a scanning electron microscope view of the light-storing ceramic prepared in the embodiment 1 of the disclosure when a scale is 5 μm.
Figure 3B:
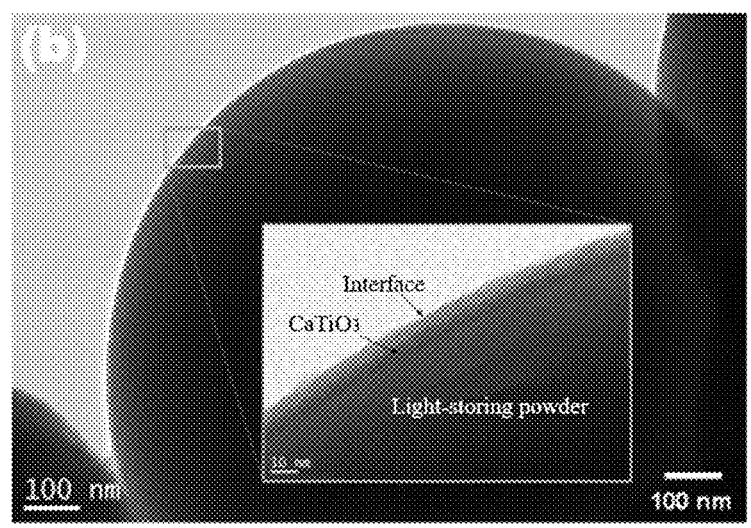
FIG. 3B is a scanning electron microscope view of the light-storing ceramic prepared in the embodiment 1 of the disclosure when a scale is 100 nm.

FIG. 3A is a scanning electron microscope view of the light-storing ceramic prepared in embodiment 1 of the disclosure when a scale is 5 μm; FIG. 3B is scanning electron microscope view of the light-storing ceramic prepared in embodiment 1 of the disclosure when a scale is 100 nm. It can be seen that calcium titanate coating is coated on the surface of light-storing powder, which is between aluminate phosphor and quartz-based ceramics.

Under a condition of 20 min light storage, 720 min persistent luminescence can be achieved: luminous intensity >4000 millicandelas per square meter (mcd/m$^2$) at initial 1 min; luminous intensity >400 mcd/m$^2$ at 60 min; luminous intensity >5 mcd/m$^2$ at 720 min (tested in outdoor direct sunlight for 20 min, fluorescent lamp for 30 min, ultraviolet lamp for 5 min, room temperature 25° C.).

Embodiment 2

A specific preparation method may include the following steps:

step (1), calcium nitrate and citric acid are weighed individually according to a mass ratio of 10:1.5, the weighed calcium nitrate and the weighed citric acid are dissolved into absolute ethanol, and magnetically stirred for 60 min at rotational speed of 300 r/min to form a calcium ethanol solution. Tetra-n-butyl titanate is weighed and dissolved into absolute ethanol, magnetically stirred for 60 min at the rotational speed of 300 r/min, and glacial acetic acid is added dropwise under stirring to form a titanium precursor solution. Under stirring, the calcium ethanol solution is added into the titanium precursor solution, oleic acid dispersant is added, and pure water and light-storing powder ($Sr_4Al_{14}O_{25}$:Eu, Dy, 500 μm of particle size) are subsequently added and continuously stirred for 4 h to obtain a light-storing powder-calcium titanate gel.

step (2), the light-storing powder-calcium titanate gel obtained by the step (1) is heated at 150° C. for 8 h to obtain a light-storing powder xerogel coated with calcium titanate, and the light-storing powder xerogel coated with calcium titanate is crushed and sieved with a sieve of 200 meshes to obtain a sieved xerogel powder.

step (3), 400 μm of glass powder, 200 mesh of xerogel powder and sodium tripolyphosphate as second dispersant are placed into a granulator, and directly mechanically stirred and granulated after adding pure water. Methylcellulose as a plasticizer is added after stirring for 8 h, and continuously stirred for 3 h to obtain a mixture, which is paste, mortar or viscous substance. A stirring speed of the stirring in the step (3) is 300 rad/min.

step (4), the mixture obtained by the step (3) are packed into a mold for tabletting by using an automatic tablet pressor, then demolded to obtain green compacts, and then the green compacts are subsequently sent to a kiln for drying and firing. A shape of the mold is square sheet (20 cm*20 cm), pressure is 40 MPa, and pressure holding time is 20 s.

step (5), heating of the kiln including: the kiln is heated from room temperature to 200° C. with a rate of 5° C./min, and then the temperature is maintained for 30 min; then the kiln is continued to heat up to 900° C. with a rate of 3° C./min and the temperature is maintained for 120 min; and a finished product is taken out after cooling down to below 100° C. in the kiln.

Embodiment 3

A specific preparation method may include the following steps:

step (1), calcium nitrate and citric acid are weighed individually according to a mass ratio of 10:1, the weighed calcium nitrate and the weighed citric acid are dissolved into absolute ethanol, and magnetically stirring for 30 min at a rotational speed of 200 r/min to form a calcium ethanol solution. Tetra-n-butyl titanate is weighed and dissolved into absolute ethanol, and magnetically stirred for 40 min at the rotational speed of 200 r/min, and glacial acetic acid is added dropwise under stirring to form a titanium precursor solution. Under stirring, the calcium ethanol solution is added into the titanium precursor solution, oleic acid dispersant is added, and pure water and light-storing powder ($Sr_4Al_{14}O_{25}$:Eu, Dy, 10 μm of particle size) are subsequently added and continuously stirred for 2 h to obtain a light-storing powder-calcium titanate gel.

step (2), the light-storing powder-calcium titanate gel obtained by the step (1) is heated at 150° C. for 8 h to obtain a light-storing powder xerogel coated with calcium titanate, and the light-storing powder xerogel coated with calcium titanate is crushed and sieved with a sieve of 100 meshes to obtain a sieved xerogel powder.

step (3), 10 μm of glass powder, 100 mesh of xerogel powder and sodium tripolyphosphate as second dispersant are placed into a granulator, and directly mechanically stirred and granulated after adding pure water. Methylcellulose as a plasticizer is added after stirring for 4 h, and continuously stirred for 1 h to obtain a mixture, which is paste, mortar or viscous substance. A stirring speed of the stirring in the step (3) is 100 rad/min.

step (4), the mixture obtained by the step (3) are packed into a mold for tabletting by using an automatic tablet pressor, then demolded to obtain green compacts, and the green compacts are subsequently sent to a kiln for drying and firing. A shape of the mold is rectangular (20 cm*30 cm), pressure is 5 MPa, and pressure holding time is 5 s.

step (5), heating of the kiln including: the kiln is heated from room temperature to 200° C. with a rate of 5° C./min, and then the temperature is maintained for 10 min; then the kiln is continued to heat up to 400° C. with a rate of 5° C./min and the temperature is maintained for 60 min; and a finished product is taken out after cooling down to below 100 100° C. in the kiln.

Embodiment 4

A specific preparation method may include the following steps:

step (1), calcium nitrate and citric acid are weighed individually according to a mass ratio of 10:1.5, the weighed calcium nitrate and the weighed citric acid are dissolved into absolute ethanol, and magnetically stirring for 50 min at a rotational speed of 200 r/min to form a calcium ethanol solution. Tetra-n-butyl titanate is weighed and dissolved into absolute ethanol, and magnetically stirred for 50 min at the rotational speed of 200 r/min, and glacial acetic acid is added dropwise under stirring to form a titanium precursor solution. Under stirring, the calcium ethanol solution is added into the titanium precursor solution, oleic acid dispersant is added, and pure water and light-storing powder ($Sr_4Al_{14}O_{25}$:Eu, Dy, 10 μm of particle size) are subsequently added and continuously stirred for 3 h to obtain a light-storing powder-calcium titanate gel.

step (2), the light-storing powder-calcium titanate gel obtained by the step (1) is heated at 150° C. for 6 h to obtain a light-storing powder xerogel coated with calcium titanate, and the light-storing powder xerogel coated with calcium titanate is crushed and sieved with a sieve of 100 meshes to obtain a sieved xerogel powder.

step (3), 10 μm of glass powder, 100 mesh of xerogel powder and sodium tripolyphosphate as second dispersant are placed into a granulator, and directly mechanically stirred and granulated after adding pure water. Methylcellulose as a plasticizer is added after stirring for 4 h, and continuously stirred for 1 h to obtain a mixture, which is paste, mortar or viscous substance. A stirring speed of the stirring in the step (3) is 100 rad/min.

step (4), the mixture obtained by the step (3) are packed into a mold for tabletting by using an automatic tablet pressor, then demolded to obtain green compacts, and the green compacts are subsequently sent to a kiln for drying and firing. A shape of the mold is rectangular (20 cm*30 cm), pressure is 5 MPa, and pressure holding time is 5 s.

step (5), firing: heating of the kiln including: the kiln is heated from room temperature to 200° C. with a rate of 5° C./min, and then the temperature is maintained for 10 min; then the kiln is continued to heat up to 400° C. with a rate of 5° C./min and the temperature is maintained for 60 min; and a finished product is taken out after cooling down to below 100° C. in the kiln.

Embodiment 5

A specific preparation method may include the following steps:

step (1), calcium nitrate and citric acid are weighed individually according to a mass ratio of 10:1, the weighed calcium nitrate and the weighed citric acid are dissolved into absolute ethanol, and magnetically stirred for 40 min at a rotational speed of 150 r/min to form a calcium ethanol solution. Tetra-n-butyl titanate is weighed and dissolved into absolute ethanol, and magnetically stirred for 30 min at the rotational speed of 150 r/min, and glacial acetic acid is added dropwise under stirring to form a titanium precursor solution. Under stirring, the calcium ethanol solution is added into the titanium precursor solution, the oleic acid dispersant is added, and pure water and light-storing powder ($Sr_4Al_{14}O_{25}$:Eu, Dy, 200 μm of particle size) are subsequently added and continuously stirred for 4 h to obtain a light-storing powder-calcium titanate gel.

step (2), the light-storing powder-calcium titanate gel obtained by the step (1) is heated at 100° C. for 6 h to obtain a light-storing powder xerogel coated with calcium titanate, and the light-storing powder xerogel coated with calcium titanate is crushed and sieved with a sieve of 100 meshes to obtain a sieved xerogel powder.

step (3), 300 μm of glass powder, 100 mesh of xerogel powder and sodium tripolyphosphate as second dispersant are placed into a granulator, and directly mechanically stirred and granulated after adding pure water. Methylcellulose as a plasticizer is added after stirring for 6 h, and continuously stirred for 2 h to obtain a mixture, which is paste, mortar or viscous substance. A stirring speed of the stirring in the step (3) is 200 rad/min.

step (4), the mixture obtained by the step (3) are packed into a mold for tabletting by using an automatic tablet pressor, then demolded to obtain green compacts, and the green compacts are subsequently sent to a kiln for drying and firing. A shape of the mold is square (20 cm*20 cm), pressure is 30 MPa, and pressure holding time is 15 s.

step (5), heating of the kiln including: the kiln is heated from room temperature to 200° C. with a rate of 3° C./min, and then the temperature is maintained for 30 min; then the kiln is continued to heat up to 800° C. with a rate of 3° C./min and the temperature is maintained for 120 min; and a finished product is taken out after cooling down to below 100° C. in the kiln.

Embodiment 6

A specific preparation method may include the following steps:

step (1), calcium nitrate and citric acid are weighed individually according to a mass ratio of 10:1, the weighed calcium nitrate and the weighed citric acid are dissolved into absolute ethanol, and magnetically stirred for 40 min at rotational speed of 150 r/min to form a calcium ethanol solution. Tetra-n-butyl titanate is weighed and dissolved into absolute ethanol, and magnetically stirred for 40 min at the rotational speed of 150 r/min, and glacial acetic acid is added dropwise under stirring to form a titanium precursor solution. Under stirring, the calcium ethanol solution is added into the titanium precursor solution, oleic acid dispersant is added, and pure water and light-storing powder ($Sr_4Al_{14}O_{25}$:Eu, Dy, 400 μm of particle size) are subsequently added and continuously stirred for 3 h to obtain a light-storing powder-calcium titanate gel.

step (2), the light-storing powder-calcium titanate gel obtained by the step (1) is heated at 100° C. for 6 h to obtain a light-storing powder xerogel coated with calcium titanate, and the light-storing powder xerogel coated with calcium titanate is crushed and sieved with a sieve of 100 meshes to obtain a sieved xerogel powder.

step (3), 400 μm of glass powder, 100 mesh of xerogel powder and sodium tripolyphosphate as second dispersant are placed into a granulator, and directly mechanically stirred and granulated after adding pure water. Methylcellulose as a plasticizer is added after stirring for 8 h, and continuously stirred for 2 h to obtain a mixture, which is paste, mortar or viscous substance. A stirring speed of the stirring in the step (3) is 150 rad/min.

step (4), the mixture obtained by the step (3) are packed into a mold for tabletting by using an automatic tablet pressor, then demolded to obtain green compacts, and the green compacts are subsequently sent to a kiln for drying and firing. A shape of the mold is required by product requirements, pressure is 25 MPa, and pressure holding time is 15 s.

step (5), heating of the kiln including: the kiln is heated from room temperature to 200° C. with a rate of 2° C./min, and then the temperature is maintained for 30 min; then the kiln is continued to heat up to 600° C. and the temperature is maintained for 90 min; and a finished product is taken out after cooling down to below 100° C. in the kiln.

What is claimed is:

1. A preparation method for improving light efficiency and stability of light-storing ceramics, comprising:
    step (1), weighing calcium nitrate and citric acid individually according to a mass ratio of 10:0.5~1.5, and dissolving the weighed calcium nitrate and the weighed citric acid into an absolute ethanol to form a calcium ethanol solution; weighing tetra-n-butyl titanate, dissolving the weighed tetra-n-butyl titanate into another absolute ethanol, and adding glacial acetic acid dropwise under stirring to form a titanium precursor solution; and under stirring, adding the calcium ethanol solution into the titanium precursor solution, adding oleic acid dispersant and subsequently adding pure water and a light-storing powder, and continuously stirring 1~4 hours (h) to obtain a light-storing powder-calcium titanate gel;
    step (2), heating the light-storing powder-calcium titanate gel obtained by the step (1) at a temperature of 80~150° C. for 2~8 h to obtain a light-storing powder xerogel coated with calcium titanate, crushing, and sieving with a sieve of 80~200 meshes to obtain a sieved xerogel powder;
    step (3), placing a glass matrix material, the sieved xerogel powder and a second dispersant into a granulator, mechanically stirring and granulating after adding pure water, adding a plasticizer after the stirring of 4~8 h, and continuously stirring for 1~3 h to obtain a mixture; wherein a stirring speed of the stirring in the step (3) is 100~300 radians per minute (rad/min);
    step (4), packing the mixture obtained by the step (3) into a mold, tableting by using an automatic tablet pressor, then demolding to obtain green compacts, and subsequently sending the green compacts to a kiln for drying and firing, wherein a shape of the mold is required by product requirements, pressure is 5~40 megapascals (MPa), and pressure holding time is 5~20 seconds(s); and
    step (5), heating of the kiln comprising: heating from room temperature to 200° C. with a rate of 2~5° C./min, and then maintaining for 10~30 min to ensure complete evaporation of water from the green compacts; then continuing to heat up to 400~900° C. and maintaining for 60~120 min; and subsequently cooling down to below 100° C. with the kiln and taking out a finished product to obtain light-storing ceramics.

2. The preparation method according to claim 1, wherein in the step (1), a mass ratio of the calcium nitrate to the tetra-n-butyl titanate is 1:0.8~2.5; in the calcium ethanol solution, a solute to solution ratio is 1:1.5~3; in the titanium precursor solution, a solute to solution ratio is 1:0.5~2.5; an adding amount of the glacial acetic acid accounts for 35%~55% of a total mass of the calcium nitrate and the tetra-n-butyl titanate; an adding amount of the oleic acid dispersant accounts for 5%~15% of the total mass of the calcium nitrate and the tetra-n-butyl titanate; a ratio of an adding amount of the pure water to the total mass the calcium nitrate and the tetra-n-butyl titanate is 1:3.5~5; and a ratio of an adding amount of the light-storing powder to the total mass of the calcium nitrate and the tetra-n-butyl titanate is 1:8~10.

3. The preparation method according to claim 1, wherein in the step (1), the light-storing powder is a light-storing powder using $SrAl_2O_3$ as a matrix and has a particle size in a range of 10~500 microns (μm).

4. The preparation method according to claim 1, wherein in step (3), the glass matrix material is a glass powder with a particle size in a range of 10~400 μm, and an adding amount of the glass powder is 90%~98% of a total mass of the xerogel powder and the glass powder.

5. The preparation method according to claim 4, wherein in the step (3), a mass ratio of the xerogel powder to the glass powder is 1:9~49; an adding amount of the second dispersant accounts for 0.1~0.6% of the total mass of the xerogel powder and the glass powder; an adding amount of the plasticizer accounts for 0.1~0.9% of the total mass of the xerogel powder and the glass powder; and an adding amount of the pure water accounts for 20%~50% of the total mass of xerogel and the glass powder.

6. The preparation method according to claim 1, wherein in the step (3), the plasticizer is methylcellulose, and the second dispersant is sodium tripolyphosphate.

\* \* \* \* \*